United States Patent Office 3,066,048
Patented Nov. 27, 1962

3,066,048
PROCESS OF MAKING MIXED OXIDE FILMS
Janina J. Mitchell, Matawan, N.J., assignor to the United States of America as represented by the Secretary of the Army
No Drawing. Filed Mar. 1, 1960, Ser. No. 12,237
12 Claims. (Cl. 117—221)
(Granted under Title 35, U.S. Code (1952), sec. 266)

The invention described herein may be manufactured and used by or for the Government for governmental purposes without the payment of any royalty thereon.

This invention relates to a process of producing ultra-thin, glass-like multi-component oxide coatings.

Only a relatively few oxides (so-called "network-formers") can be made into one component glasses. However, quite a number of oxides, (network modifiers and network intermediates) altho unable by themselves to form glasses, if mixed with sufficient amounts of glass-forming oxides can form practical multi-component glasses. According to the polyhedral network theory of glasses these generally desirable modifying oxides are incorporated into the glass by having their metallic atoms or cations relatively loosely bound in the holes or interstices between polyhedrons. (See Encyclopedia of Chemical Technology; Kirk and Othner, Interscience, N.Y., 1951, page 203.)

It has long been known to coat solid materials made from ceramic, metals, etc. with a film or coating of glass or glass-like materials. There are many ways in which such coatings of vitreous enamels, glasses, and similar multi-oxide solids can be made. Vitreous enameling encompasses a complicated process in which the so-called "frit" is ground into a fine powder dispersed in a liquid medium and coated on the article, whereupon the coated article is heated to the curing temperature of the frit. This process necessitates usually the heating of the whole article to temperatures of about 1000 to 1300° C. It has also been proposed to flame-spray the solid coatings by feeding the powders into a powder flame-spray burner. Another known process consists in using the flame-spray technique for burning combustible reactants. In this process a plurality of oxides from a combustible organic compound is fed together with an oxygen containing gas into a burner in which the oxides combine and impinge onto the receiving surface to be coated.

In all these known methods high temperatures in the neighborhood of 1000° C. have to be used and special provisions have to be made if particularly thin films are desired.

I now have found that ultra-thin, glass-like metal oxide films of high dielectric properties can be made by coating the material to be covered at room temperature with an alcoholic solution of a mixture of the alcoholates of the metals the oxides of which are to compose a glass-like film, allowing the alcohols to vaporize off and heating the dried mixture of metal oxides to completely converting the metal oxides to a glass-like oxide network. Usually heating to about 300° C. is sufficient.

The invention will become more apparent from the following examples which are meant to serve as illustrations:

*Example 1*

In order to make a film consisting of a glass-like mixture of the oxides of barium, strontium and titanium a solution of a mixture of barium, strontium and titanium alcoholates in an organic solvent is first prepared in the following manner:

(a) Barium metal having a purity of about 99% is reacted with anhydrous methyl alcohol forming a solution of barium methylate in methyl alcohol. A slight precipitate may form; the clear supernatant liquid is decanted from the solid precipitate and this liquid is then analyzed for its barium content. The barium methylate solution used in this example contanied 10.3% barium. Of this solution 16.63 ml. are mixed with 51.85 ml. of anhydrous methyl alcohol.

(b) A solution of strontium methylate in methyl alcohol is made in similar manner and analyzed for strontium content. The strontium solution used in this example contained 1.12% strontium. 25.26 ml. of this strontium methylate solution is mixed with the above-described 16.63 ml. of barium methylate in 51.85 ml. of anhydrous methyl alcohol.

To this solution of barium and strontium methylate in methyl alcohol is added 6.26 ml. of commercially available titanium isopropylate which is an anhydrous liquid containing no solvents. The resulting mixture is a clear solution which if protected from moisture remains clear at room temperatures. This solution of barium, strontium and titanium alcoholates in methyl alcoholate contains now about 3% of the metals in the following proportions of solids: 57.08% barium, 33.49% titanium and 9.43% strontium.

According to the invention this mixture of metal alcoholates may now be used for coating the surface of any appropriate material such as metals, ceramics, etc. In this example the solution has been used to produce a glass-like oxide film on chrome-plated metal plates having about $\frac{1}{32}$ to $\frac{1}{16}$ of an inch in thickness. Such plates are available, for instance, under the name "photographic ferrotype." A number of such metal plates (about 3 inches long and 2 inches wide) have been dipped at room temperature in the above-described solution and withdrawn preferably at a constant rate of about 9 inches per minute. At this rate most of the free alcohol evaporates from the surface of the plate as it comes out of the solution. After the plate is completely removed from the solution it is put in a 100° C. oven and the temperature is raised to about 300 to 350° C. and kept at this temperature for a period of time necessary for the formation and completion of the mixed metal oxide network. In the above-described example the coated metal plates were kept at 300° C. for about 10 to 15 minutes. During this time the coating is transformed into an ultra-thin film of glass-like character having a high dielectric constant. For most purposes this first film formed by only one dipping is too thin to give any workable strength. To increase this strength the coated metal plate after having been treated for 15 minutes at 300° C. will again be dipped into the same solution as described above and treated in the same manner. Additional coatings may be added by following the same procedure.

The following data show the relation between the capacitance and the thickness of the film expressed in number of coatings: After 2 coats the capacitance is about 1.2 microfarads per square inch; after 3 coats it is about 1.1; after 5 coats 0.6; after 6 coats 0.55; after 8 coats 0.47 and after 12 coats 0.25.

In all cases the dissipation factor is very low (below 1%) except for a thickness of 3 coats or less. The dielectric strength increases with the number of coatings. With 12 coatings the leakage current if tested at 30 volts is approximately 0.2 microampere. The temperature coefficient is fairly constant and changes in capacitance are about 5% within a temperature range from —55° C. to 124° C.

*Example 2*

In this example a film consisting of a mixture of oxides of barium, titanium, strontium and silicon has been made starting from a mixed solution of barium methylate, strontium methylate, titanium isopropylate and ethyl ortho silicate. The barium and strontium methylates were made in the manner described in Example 1. A commercially available pure ethyl ortho silicate containing no solvents has been used to supply the silicon oxide. The process is carried out in the following manner:

1.6 ml. barium methylate in methyl alcohol (containing 11.9% barium) are mixed with 92.4 ml. of anhydrous methyl alcohol. To that mixture is added 11.16 ml. of strontium methylate solution in methyl alcohol (containing 1.37% strontium), 2.02 ml. of pure ethyl silicate are then added and finally 6.82 ml. of pure titanium isopropylate are added. The total solid content of metals in this liquid mixture is 2.4% which total solid content consists of 50% barium, 35.8% titanium, 5.1% strontium and 9.1% silicon.

The above-described solution has then been used to coat chrome-plated metal plates in the manner described in Example 1. The properties of the finished product are on an average about 10% better than the finished product made according to Example 1.

*Example 3*

In this example a film consisting of a mixture of oxides of barium, strontium and titanium was produced in the following manner:

7.71 ml. of barium methylate solution in anhydrous methyl alcohol containing 10.72% barium is mixed with 129.13 ml. of anhydrous methyl alcohol. To this mixture is added 10.11 ml. of strontium methylate solution in anhydrous methyl alcohol containing 1.35% strontium, and 3.05 ml. of titanium isopropylate. The solutions of barium methylate and strontium methylate are made in the manner described in Example 1. The titanium isopropylate is a commercially available anhydrous liquid containing no solvents. The resulting mixture of the above-described liquids is a clear solution containing 1.0% solids consisting of 55.1% barium, 35.8% titanium and 9.1% strontium.

This mixture of metal alcoholates is now used for coating the surface of any appropriate material in the manner described in Example 1.

The following data show the relation between the capacitance readings and the thickness of the film expressed in number of coatings:

After 6 coats the capacitance is about 1.3 microfarads per square inch; after 8 coatings 1.13 microfarads; after 10 coatings 0.82 microfarad; after 12 coatings 0.65 microfarad. The dissipation factor varied from 1.5 to 2.0%.

*Example 4*

In this example a film consisting of tantalum oxide and niobium oxide has been made from a mixed solution of tantalum isopropylate and niobium isopropylate. Both solutions were commercially obtained 100% solutions containing no other solvents and the mixture was made in the following manner:

2 ml. each of tantalum isopropylate and niobium isopropylate were mixed with 146 ml. of anhydrous methyl alcohol at room temperature. A clear stable solution was obtained containing 0.825% solids consisting of 61.34% tantalum and 38.64% niobium.

The above-described solution was used for preparing coatings in the manner described in Example 1. A film consisting of 5 coats showed an average capacitance of 3.6 microfarads per square inch and a dissipation factor of about 2.9%. 10 coats showed a capacitance of 1.95 microfarads per square inch and the dissipation factor was about 1.8%.

*Example 5*

In this example a film consisting of a mixture of titanium oxide and niobium oxide was made starting from a mixed solution of titanium isopropylate (as mentioned in Examples 1 and 3) and niobium isopropylate which is also commercially available as a liquid containing no other solvents.

1 ml. of niobium isopropylate is added to 96.73 ml. of ethyl alcohol. After a thorough mixing of the above solutions 2.27 ml. of titanium isopropylate are added to the above solution at room temperature. A clear liquid is obtained containing 0.598% metallic solids containing 60% titanium and 40% niobium.

This solution is now used in the manner described in Example 1 for making a mixed oxide film. The capacitance of a film consisting of 12 coats has been measured and found to be 1.72 microfarads per square inch.

*Example 6*

In this example a metal oxide film consisting of the oxides of tantalum, niobium and silicon was made using commercially available tantalum isopropylate, niobium isopropylate and ethyl silicate as described in the previous examples. The mixture was made in the following manner:

1.26 ml. of tantalum isopropylate was mixed with 92 ml. of anhydrous methyl alcohol. To this mixture was added under stirring at room temperature 1.26 ml. of niobium isopropylate and 5 ml. of ethyl silicate. This mixture now contains 1.46% solids consisting of 46.35% silicon; 32.93% tantalum and 20.75% niobium.

A film consisting of 12 coats, made in the manner as described in Example 1 showed a capacitance of 0.932 microfarad per square inch.

It will be obvious to those skilled in the art that the above-described examples constitute only illustrate embodiments of the broad invention idea and that various modifications and combinations may be used without departing from the spirit of the invention as defined in the following claims.

What is claimed is:

1. A process for producing ultra-thin, non-porous, glass-like, multi-component oxide coatings comprising preparing a mixture of metal alcoholates in an organic solvent in proportions in which the metal oxides form a glass-like product, coating at room temperature the surface of a material with a thin film of said mixture, allowing the organic solvent to evaporate, heating the dried film at a temperature between about 300 to 350° C. for a period of time necessary for the formation and completion of the mixed metal oxide network, and repeating said steps of coating at room temperature, allowing the organic solvent to evaporate and heating at about 300 to 350° C. until the desired film thickness is obtained.

2. A process of producing glass-like coatings according to claim 1 in which the mixture of metal alcoholates comprises barium alcoholate, strontium alcoholate and titanium alcoholate.

3. A process of producing glass-like coatings according to claim 2 in which the mixture of alcoholates comprises barium methylate, strontium methylate and titanium isopropylate.

4. A process of producing glass-like coatings according to claim 1 in which the mixture of metal alcoholates comprises barium alcoholate, strontium alcoholate, titanium alcoholate and silicon alcoholate.

5. A process of producing glass-like coatings according to claim 4 in which the mixture of alcoholates comprises barium methylate, strontium methylate, titanium isopropylate and ethyl ortho silicate.

6. A process of producing glass-like coatings according to claim 1 in which the mixture of metal alcoholates comprises tantalum alcoholate and niobium alcoholate.

7. A process of producing glass-like coatings according to claim 5 in which the mixture of metal alcoholates comprises tantalum isopropylate and niobium isopropylate.

8. A process of producing glass-like coatings according to claim 1 in which the mixture of metal alcoholates comprises titanium alcoholate and niobium alcoholate.

9. A process of producing glass-like coatings according to claim 8 in which the mixture of metal alcoholates comprises titanium isopropylate and niobium isopropylate.

10. A process of producing glass-like coatings according to claim 1 in which the mixture of metal alcoholates comprises tantalum alcoholate, niobium alcoholate and silicon alcoholate.

11. A process of producing glass-like coatings according to claim 10 in which the mixture of metal alcoholates comprises tantalum isopropylate, niobium isopropylate and ethyl silicate.

12. A process of producing glass-like coatings according to claim 1 in which the dried film is heated at about 300° C. for about 10 to 15 minutes.

References Cited in the file of this patent

UNITED STATES PATENTS

| | | |
|---|---|---|
| 2,805,965 | Robinson | Sept. 10, 1957 |
| 2,887,413 | Ekkers et al. | May 19, 1959 |
| 2,943,955 | Brill | July 5, 1960 |